United States Patent [19]

Brenner et al.

[11] 4,191,903

[45] Mar. 4, 1980

[54] DYNAMOELECTRIC MACHINE WITH AIR GAP ARMATURE WINDING

[75] Inventors: William C. Brenner, Fox Chapel Borough; Charles C. Sterrett, Pittsburgh, both of Pa.

[73] Assignee: Westinghouse Electric Corp., Pittsburgh, Pa.

[21] Appl. No.: 891,999

[22] Filed: Mar. 29, 1978

[51] Int. Cl.² ............................................. H02K 3/14
[52] U.S. Cl. ....................................... 310/213; 310/52; 310/198; 310/260
[58] Field of Search ...................... 310/213, 10, 40, 52, 310/260, 198–208, 179, 194; 174/33, 34

[56] References Cited

U.S. PATENT DOCUMENTS

| | | | |
|---|---|---|---|
| 1,823,089 | 9/1931 | Cornu | 310/213 |
| 3,381,154 | 4/1968 | Madsen | 310/213 |
| 3,495,114 | 2/1970 | Kazansky | 310/179 |
| 3,529,192 | 9/1970 | Davies | 310/179 |
| 3,743,867 | 7/1973 | Smith | 310/52 |
| 3,761,752 | 9/1973 | Anderson | 310/179 |
| 3,781,578 | 12/1973 | Smith | 310/52 |
| 3,816,780 | 6/1974 | Smith | 310/52 |
| 4,092,555 | 5/1978 | Ying | 310/52 |
| 4,123,676 | 10/1978 | Cooper | 310/52 |

Primary Examiner—R. Skudy
Attorney, Agent, or Firm—G. H. Telfer

[57] ABSTRACT

An air gap armature winding is provided for large generators. The armature winding preferably consists of conductors closely packed together in the air gap so that the maximum cross section of conductors can be used, and several radial layers of such conductors may be used. In order to permit forming the end portions of the winding conductors to the usual diamond or an equivalent) configuration, certain of the conductors lying at circumferentially spaced intervals are displaced radially in the end portions to make from for end turns to be formed. The displaced conductors are disposed so that the radial thickness of the end turn portions is not unduly increased.

11 Claims, 6 Drawing Figures

DYNAMOELECTRIC MACHINE WITH AIR GAP ARMATURE WINDING

BACKGROUND OF THE INVENTION

The present invention relates to dynamoelectric machines and more particularly to a winding configuration for an air gap armature winding for such machines, particularly machines with superconducting field windings on the rotor. In its broader aspects the invention is also applicable to machines having non-superconducting field windings.

Large alternating current generators with superconducting field windings offer great potential benefits. Such machines operate with no losses in the field winding itself and thus can provide higher magnetic fields than conventional generators and with greater efficiency. This makes it possible to achieve a greatly increased electrical rating for a machine of given size with high efficiency, and the substantial elimination of field copper losses during operation represents a very substantial saving in operating cost.

Such a machine has a rotating field member consisting of a cylindrical rotor with the field winding disposed in slots in its surface. The field winding conductors may be made of superconducting material; if so, means are provided for circulating a cryogenic coolant fluid during operation to maintain the windings in the superconducting state. Such a winding produces very high flux densities in the air gap, as compared to conventional machines, and in order to take full advantage of this high magnetic field, it is desirable to use the maximum number (or cross-section) of armature conductors. The gross cross-section of the conductors can be greatly increased by eliminating the conventional stator teeth and completely filling the enlarged air gap space thus provided with armature conductors packed together to extend over the entire circumferential extent of the air gap and preferably arranged in several layers. (A larger cross-section of the conductors is normally achieved by increasing the size of individual conductors. A greater number of smaller sized conductors can also be effective.) The stator core becomes a magnetic shield on the outside of the air gap winding.

The physical arrangement of such an air gap winding presents certain problems. In conventional windings for dynamoelectric machines, stator coils of the so-called diamond type are commonly used. In such coils, the end portions of each conductor, beyond the ends of the stator core, are inclined at an angle to the straight body portion of the conductor so as to extend in a substantially helical path around the circumference of the core for connection to the similar end portions of other conductors lying in circumferentially spaced positions in the stator. In an air gap winding as discussed above, however, where the conductors are packed together substantially in contact around the entire circumference of the air gap, the end portions cannot be bent as described because there is insufficient circumferential space for the inclined portions of the conductors. It has been proposed to avoid this problem by the use of other types of air gap windings such as concentric windings or helical windings as shown, for example, in Davies U.S. Pat. No. 3,529,192 and Anderson U.S. Pat. No. 3,761,752. Windings of these types, however, are undesirable as they are difficult and expensive to install and do not take full advantage of the air gap magnetic flux. Various other expedients have been proposed, therefore, to permit the use of a diamond-like coil. Thus, thin insulating spacers have been placed between conductors in the body portion of the machine, but this reduces the space available for conductors and is undesirable for that reason. It has also been proposed to lift alternate conductors radially outward in the end turn region to permit the coil end portions to be bent. The effect of this, however, is to double the radial thickness of the end turn portions of the winding which is undesirable.

SUMMARY OF THE INVENTION

In accordance with the present invention, a winding configuration is provided for air gap armature windings particularly for superconducting generators which provides space to form the end windings without unduly or excessively increasing the radial thickness of the end turn portion. A winding in accordance with the invention consists of a suitable number of insulated conductors extending longitudinally of the air gap and arranged in a plurality of radially disposed cylindrical layers. The conductors in each layer are placed side-by-side substantially in contact with each other, so that they completely fill the circumferential extent of the air gap. In the end portions, circumferentially spaced groups of conductors, each consisting of one conductor from each layer, are displaced radially so as to provide space for the remaining conductors to be formed angularly as required for making end connections, which may be in the usual diamond configuration. The radially displaced conductors are preferably turned so as to lie side-by-side in a single cylindrical layer on top of the other conductors so that the radial thickness of the end turn portion of the winding is not greatly increased. The radially displaced conductors are bent similarly to the others to form the end turns and may be bent either in the same direction as the other conductors or in the opposite direction. In this way, a winding is produced which satisfies the requirements as the air gap space is completely filled with conductors, except for the necessary insulation, but the conductors can be formed in the end turn region into a reasonable end turn configuration, such as the usual diamond configuration, so that the advantages of this type of winding are retained.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
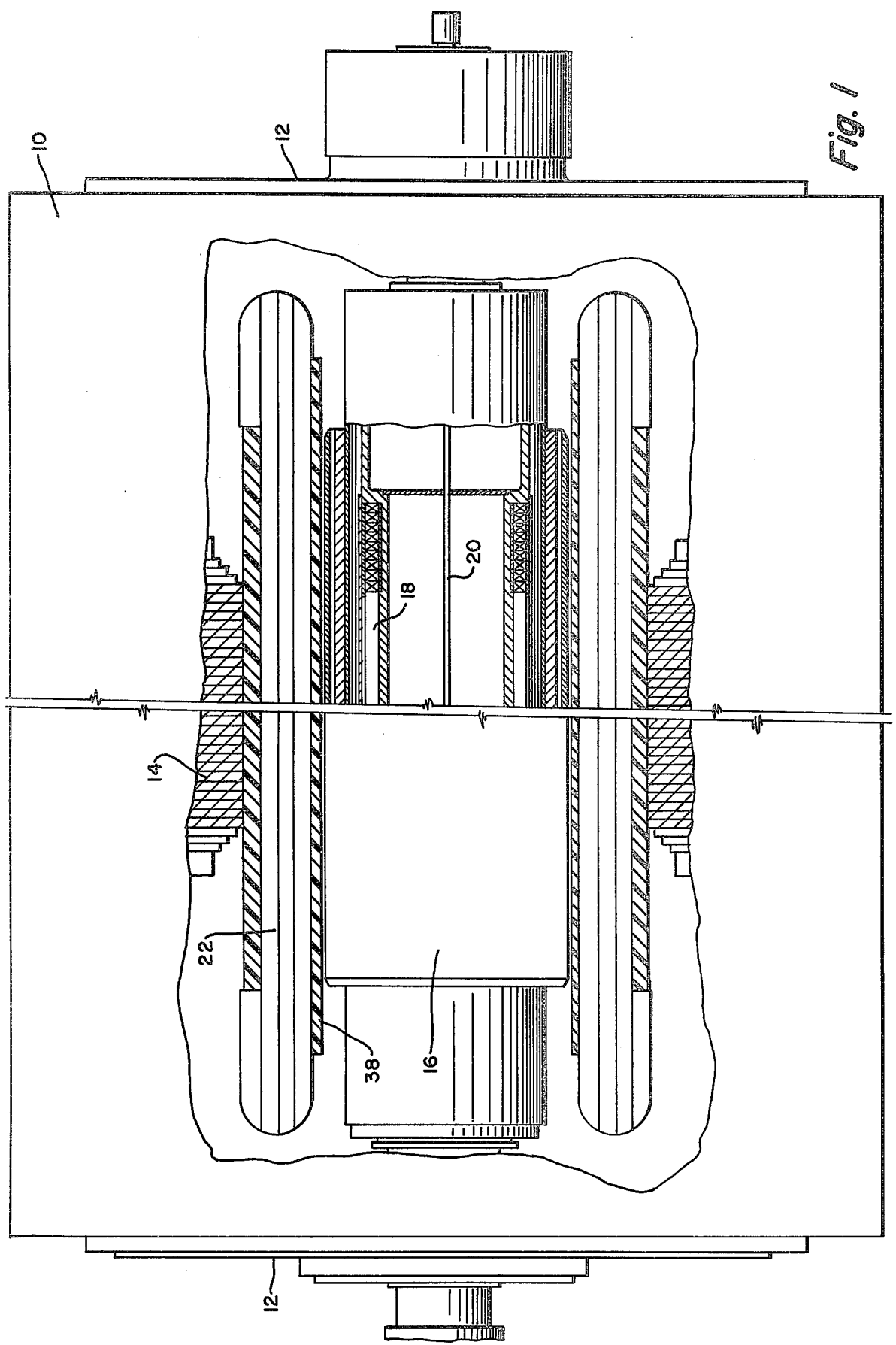
FIG. 1 is a side elevation of a generator embodying the invention with the housing partly broken away.

The invention is shown in the drawings embodied in an air gap winding for a large alternating current machine, such as turbine generator. The machine may be of any suitable or desired construction and is shown as having a gas-tight housing 10 closed at the ends by bearing brackets 12. The housing 10 contains a suitable coolant gas and may be of any suitable construction. A laminated magnetic shield 14 is supported in the housing 10 in any suitable or usual manner and may be generally similar to the usual stator core except that it need have no teeth for receiving windings. The machine also has a rotor member 16 of any suitable type supported in bearings (not shown) in the brackets 12. The rotor carries field windings 18 disposed in peripheral slots. The windings 18 are preferably made of superconducting material and are maintained at superconducting temperature during operation by circulation of a cryogenic coolant such as liquid helium supplied through a passage 20 from a suitable external refrigeration system. The rotor 16 may be of any suitable construction and has not been shown in detail since it is not a part of the present invention. A suitable rotor construction is shown, for example, in copending applications of G. D. Cooper et al., Ser. Nos. 734,941 and 734,943, filed Oct. 22, 1976, and assigned to the Assignee of the present invention now respectively U.S. Pat. Nos. 4,152,609, issued May 1, 1979, and 4,123,676, issued Oct. 31, 1978.

The description herein is primarily with reference to machines having superconducting field windings because they achieve high flux densities with which the air gap stator winding in accordance with this invention is very useful. However, it is to be understood the use of the air gap stator winding is not limited to superconducting machines.

A stationary armature winding 22 is provided in the air gap between the stator magnetic shield 14 and the periphery of the rotor 16. Magnetic shield 14 is one means for support of winding 22 although other suitable means may be used. As previously discussed, the use of superconducting field windings makes possible a very high flux density in the air gap, as compared to the flux densities obtainable in conventional machines, and in order to take full advantage of this high magnetic field, it is desirable to eliminate the usual stator teeth. This results in a relatively large radial air gap and makes it possible to obtain a very high output by using the maximum possible bulk of armature conductors which can be packed into the air gap. The problem of insulating the conductors is also somewhat alleviated since the absence of teeth eliminates the need for full ground insulation on each coil as there is no point within the winding at ground potential. Only coil-to-coil insulation is required between adjacent conductors, with the necessary additional insulation between coils of different phases and between the winding and the shield 14. The complete winding thus consists only of conductors and insulation in a cylindrical configuration, and may be assembled on an insulating tube for insertion into the air gap as a complete winding.

The preferred winding arrangement, therefore, consists of the necessary number of insulated conductors extending longitudinally through the air gap and placed side-by-side substantially in contact with each other, so that they fill the complete circumferential extent of the air gap. A plurality of radially disposed cylindrical layers of such conductors is provided because of the radial depth available in the large air gap. Thus, the volume usually dedicated to teeth and slots and, in some instances, a portion of the volume usually dedicated to the air gap itself, can be filled with conductors and the necessary insulation, the conductors being stranded as necessary and preferably of larger size than in conventional machines. The maximum cross-sectional area or number of conductors is thus packed into the air gap to take full advantage of the high magnetic field to obtain the maximum output.

As previously mentioned, however, this winding arrangement involves a difficult problem in the end portions of the winding beyond the ends of the air gap itself. The most desirable configuration, of course, would use a conventional end turn configuration in which the end portion of each conductor beyond the normal straight portion of the coil is bent angularly to extend in a substantially helical path around the stator for connection to a similar end portion of another conductor at a circumferentially spaced location to form a complete coil. Such coils, or end turns, will, for convenience be sometimes referred to herein as "diamond" coils or end turns, as they are frequently referred to in the art. However, the exact nature of the complete end turns is not critical to the present invention. Instead the point is to provide an air gap winding that permits diamond-type and generally similar types of end turns to be formed.

Figure 2A:
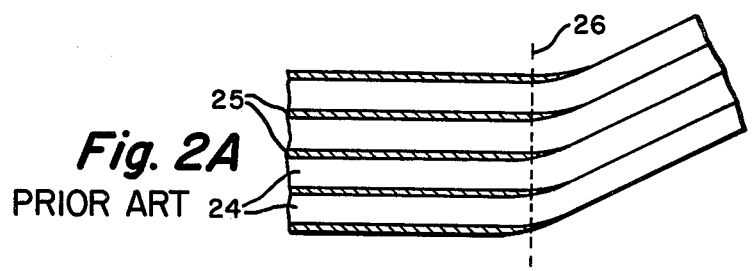
FIGS. 2A and 2B are diagrams illustrating end turn configurations.
Figure 2B:
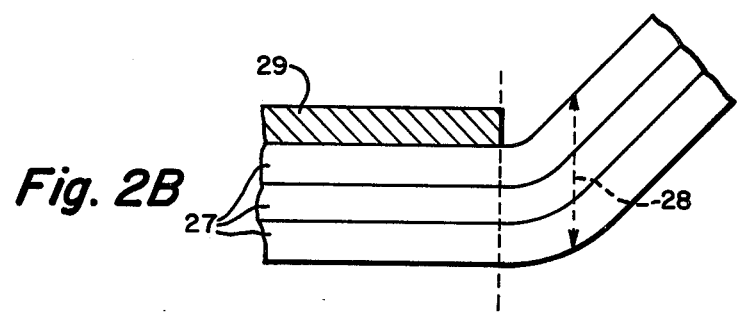

With the complete circumference of the air gap occupied by tightly packed conductors, however, such a configuration is not possible. The problem is illustrated in the diagrams of FIGS. 2A and 2B. FIG. 2A shows several winding conductors 24 extending through a stator core of conventional type and separated by the usual stator teeth 25. In the end turn region beyond the end of the core, indicated at 26, the conductors 24 are bent, or inclined angularly, with respect to the slot portions of the conductors. Because of the spacing between conductors due to the teeth 25, there is no problem in making this angular bend since there is sufficient circumferential space for the inclined conductors. In FIG. 2B, however, three conductors 27 are shown disposed side-by-side in subtantial contact, with no spacing between them, and bent at the desired angle beyond the end of the core to form diamond coils. It will be seen that the circumferential distance required for the three inclined conductors, indicated at 28, is essentially the same as that required by four straight conductors, a fourth conductor being indicated by the shaded area 29. That is, if the fourth conductor were present at the position indicated, it would be impossible to bend the four conductors at the angle shown since there is sufficient space for only three bent conductors. For this reason, it is not possible to completely fill the circumferential extent of the air gap with conductors and still form the desired end turn portion.

Figure 3:
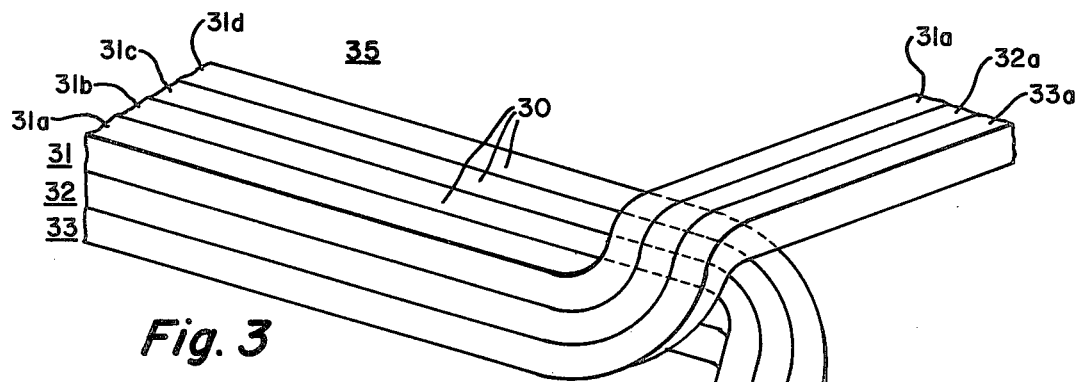
FIG. 3 is a perspective view of the end turn portion of one group of conductors of an armature winding embodying the invention.
Figure 4:
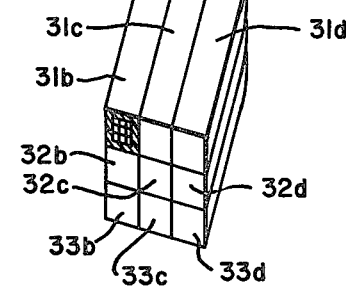
FIG. 4 is a somewhat diagrammatic plan view of a part of the end turn portion of the winding.
Figure 4:
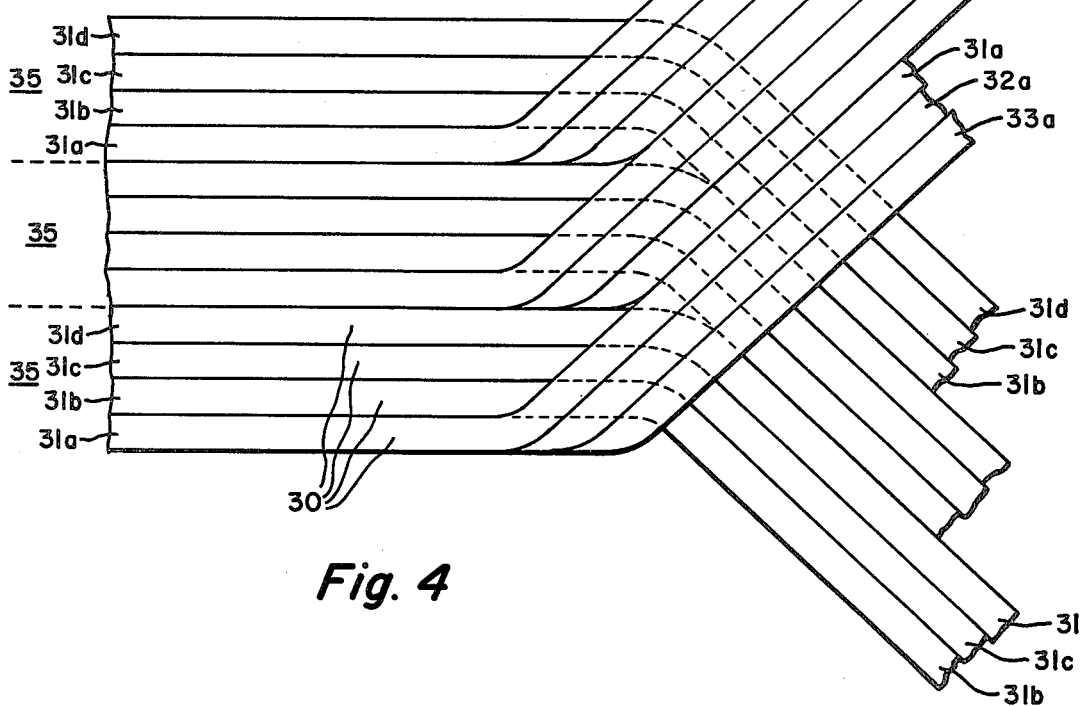

In accordance with the present invention, this problem is overcome by arranging the conductors in a manner which provides sufficient peripheral space to form end windings of the coils but without unduly increasing the total radial thickness of the end turns. As shown in FIGS. 3 and 4, a winding 22 embodying the invention may consist of a plurality of insulated conductors 30 extending longitudinally of the air gap. The conductors are preferably rectangular and each conductor is stranded and transposed as necessary and suitably insulated for the coil-to-coil voltage or the phase voltage. The conductors 30 are disposed in groups 35, one of which is shown in perspective in FIG. 3 which shows the arrangement of the end portions of the conductors. The conductors 30 extend longitudinally through the air gap and are placed side-by-side in contact with each other as shown. The conductors of the group shown in FIG. 3 are placed in three radially disposed layers 31, 32 and 33 with four conductors in each layer designated 31a, 31b, 31c and 31d; 32a . . . 32d; and 33a . . . 33d. FIG. 4 is a developed plan view of part of the winding 22 showing three of the groups 35 of FIG. 3 placed side-by-side. It will be understood that the winding continues as shown in FIG. 4 around the entire circumferential extent of the air gap so that the air gap is completely filled with insulated conductors placed side-by-side in contact and arranged in three radial layers.

If the conductors of such a winding were simply extended beyond the air gap into the end region, it would be impossible to form the end portions into a diamond coil configuration for the reasons discussed above. In accordance with the invention, therefore, the end portions of the winding conductors are arranged as shown in FIGS. 3 and 4. That is, certain of the conductors at spaced intervals around the air gap are radially displaced out of the layers of conductors. In the illustrated embodiment, each group 35 of the winding consists of four circumferentially displaced conductors 30 in each of the three layers. Three of these conductors extend out into the end region and the fourth conductor in each layer, shown as conductors 31a, 32a and 33a, is radially displaced. Thus, those conductors which are spaced apart at intervals of four conductors around the air gap are removed from the layers of the winding and leave spaces at regular intervals of sufficient extent to allow the remaining conductors to be bent at the necessary angle to form diamond end turn portions, as shown in FIG. 4.

The radially displaced conductors are bent upward, as best seen in FIG. 3, and are preferably turned sideways so as to lie in a single cylindrical layer on top of the three layers of the remaining conductors. Since these three conductors of each group occupy a circumferential space large enough for four unbent conductors in the air gap, they can also be bent as shown to form diamond coils. The displaced conductors are shown as being inclined in the opposite direction to the remaining conductors for visual clarity in segregating the top layer of conductors from the lower layers, but they could, of course, be bent in the same direction if desired. Sufficient circumferential space is thus provided to allow the end portions of the conductors 30 to be inclined angularly to the air gap portions so as to form diamond coils with the usual end turn configuration. This is done without unduly increasing the total radial thickness of the end turn portion since, in the arrangement shown, only one additional radial layer is required beyond the three layers which extend through the air gap, so that the total radial thickness is not greatly increased over that of the air gap portion. The coils thus formed can be connected as desired to form a wave or lap winding of any usual or suitable type, and the advantages of the conventional winding arrangement are thus obtained while at the same time, the maximum cross-sectional area of conductors is provided in the air gap to take full advantage of the high magnetic flux density available in a machine with, for example, superconducting field windings.

It will be seen that a winding is thus provided which may be of cylindrical configuration and utilizes essentially the entire space availabe in the air gap for conductors. The winding can easily be manufactured with the conventional diamond end turn arrangement so that usual winding connections can be used. The winding can be assembled in the machine in any desired manner but is preferably formed on an insulating cylinder, or between two such cylinders, and embedded in suitable insulation 38 for assembly as a unit into the machine. Any desired number of radial layers of conductors may be utilized depending on the size of the conductors and the radial depth of the air gap. Similarly, the circumferential spacing between the radially displaced conductors can be varied as required by the particular configuration of the winding, although it has been found that with three radial layers, a spacing of three conductors between the radially displaced conductors provides a very satisfactory arrangement.

Figure 5:
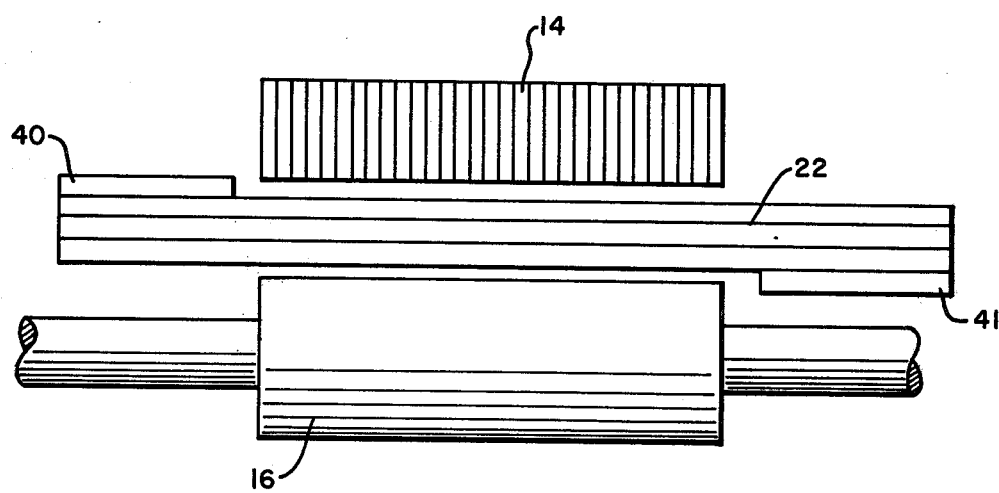
FIG. 5 is a diagrammatic sectional view of a somewhat modified embodiment of the invention.

The winding so far described involves radial displacement of certain conductors outwardly with respect to the axis of the machine as illustrated in FIGS. 3 and 4. This results in a winding configuration such as that of FIG. 1 which can be assembled as a unitary structure in the machine if desired. The radial displacement of the displaced conductors, however, can be radially inward as well as outward, and in some cases, this may be utilized to provide a more desirable arrangement such as that of FIG. 5. As there shown diagrammatically, the winding is essentially similar to the arrangement previously described except that at one end of the machine, the radially displaced conductors, indicated at 40, are dispaced radially outward with respect to the axis of the machine in the manner illustrated in FIGS. 3 and 4, while at the other end the corresponding conductors 41 are radially displaced inwardly toward the axis. As shown in FIG. 5, this results in an arrangement in which the interior and exterior diameters of the winding assembly are different at opposite ends. In such a construction, the winding can be assembled in the machine by inserting it axially into the shield 14 from the left-hand side, as viewed in FIG. 5 as the outer diameter of the winding at its right-hand end is the same as in the central portion of the winding and can be made essentially the same diameter as the internal diameter of the shield. The rotor 16 can then also be inserted from the left-hand end of the machine since the internal diameter of the winding at that end is the same in both the end turn portion and the central portion so that the rotor can easily be inserted without interference. This configuration of the winding, therefore, may be advantageous for assembly of the machine.

It will now be apparent that an air gap armature winding has been provided for machines, such as those with superconducting field windings, which takes full advantage of the high air gap flux density obtainable in such machines by utilizing the maximum cross section of winding conductors that can be packed in the air gap while at the same time making it possible to utilize the usual diamond end turn configuration in the end portions of the winding beyond the air gap and without excessively or undesirably increasing the radial thickness of the end turn portion. This winding does not involve any unusual or excessively different manufacturing problems as the winding conductors can easily be formed to the desired configuration and assembled either in the machine or on an insulating tube for assembly of the complete winding.

It will be noted that the circumferential arrangement of rectangularly cross-sectional coils can achieve nearly full contact between adjacent coils because the total circumference is large compared to an individual coil's dimension. A more ideal, truly full contact, arrangement can be achieved by some modest tapering of individual coils so their "radial" surfaces are truly in radial planes. In some instances a few "teeth," which may be tapered, may be disposed on the stator core or shield for mechanical support against developed torque and for facilitating a sound arrangement of coils therebetween, while maintaining substantially all the circumferential volume in coils.

What is claimed is:

1. In a dynamoelectric machine having a stator member and a rotor member carrying a field winding, the stator member including a stationary armature winding comprising a plurality of insulated conductors disposed longitudinally of the air gap in a plurality of layers, the conductors of each layer lying side-by-side with adjacent conductors substantially in contact to occupy substantially the entire circumferential extent of the air gap, the conductors having end portions extending beyond the air gap at each end thereof, the end portions of certain of said conductors lying at spaced intervals in each layer being displaced radially out of said layers into a single additional layer, and the end portions of all the conductors being angularly inclined to extend around the stator member for electrical connection to other conductors in spaced positions.

2. The combination of claim 1 in which the conductors of the several layers are radially aligned in the air gap and the end portions of the radially displaced conductors are positioned to lie side-by-side in another layer.

3. The combination of claim 2 in which there are at least two radial layers of conductors in the air gap.

4. The combination of claim 3 in which the radially displaced conductors in each layer are spaced apart by at least three other conductors.

5. The combination of claim 3 in which said radially displaced conductors are inclined angularly in the opposite direction to the remaining conductors.

6. The combination of claim 3 in which at least some of the radially displaced conductors are displaced inwardly toward the axis of the machine.

7. The combination of claim 3 in which said radially displaced conductors are displaced inwardly at one end of the machine and outwardly at the other end.

8. The combination of claim 3 in which said radially displaced conductors are inclined angularly in the same direction as the remaining conductors.

9. The combination of claim 1 wherein said field winding is of the superconductive type and said stationary armature winding is supported between said rotor member and a magnetic shield comprising part of said stator member.

10. The combination of claim 9 wherein said magnetic shield is of cylindrical configuration comprising stacked laminations.

11. The combination of claim 1 wherein:
said plurality of layers is of a number of at least three and the conductors of said plurality of layers are substantially radially aligned in the air gap with end portions of the radially displaced conductors positioned to lie side-by-side in a single additional layer so that the end turn region of all of said conductors comprises less than two times the number of conductor layers in the air gap.

* * * * *